(12) United States Patent
Yamada et al.

(10) Patent No.: US 10,435,033 B2
(45) Date of Patent: Oct. 8, 2019

(54) DRIVING SUPPORT DEVICE, DRIVING SUPPORT SYSTEM, DRIVING SUPPORT METHOD, AND AUTOMATIC DRIVE VEHICLE

(71) Applicant: Panasonic Intellectual Property Management Co., Ltd., Osaka (JP)

(72) Inventors: Kazushige Yamada, Kanagawa (JP); Osamu Yamaji, Hiroshima (JP); Azusa Gojyo, Kanagawa (JP); Satoshi Kajita, Kanagawa (JP); Toshiaki Mori, Kanagawa (JP); Makoto Okada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/325,978

(22) PCT Filed: Jul. 19, 2016

(86) PCT No.: PCT/JP2016/003384
§ 371 (c)(1),
(2) Date: Jan. 12, 2017

(87) PCT Pub. No.: WO2017/022200
PCT Pub. Date: Feb. 9, 2017

(65) Prior Publication Data
US 2017/0197637 A1 Jul. 13, 2017

(30) Foreign Application Priority Data
Jul. 31, 2015 (JP) .................... 2015-152852

(51) Int. Cl.
*B60W 50/10* (2012.01)
*B60W 30/18* (2012.01)
(Continued)

(52) U.S. Cl.
CPC ............ *B60W 50/10* (2013.01); *B60K 35/00* (2013.01); *B60K 37/06* (2013.01);
(Continued)

(58) Field of Classification Search
CPC ..................................................... G06Q 50/30
See application file for complete search history.

(56) References Cited

U.S. PATENT DOCUMENTS

2006/0224316 A1 10/2006 Ishida et al.
2010/0023257 A1 1/2010 Machino
(Continued)

FOREIGN PATENT DOCUMENTS

GB 2481536 A 12/2011
JP 2004-338496 A 12/2004
(Continued)

OTHER PUBLICATIONS

International Search Report of PCT application No. PCT/JP2016/003384 dated Oct. 25, 2016.

*Primary Examiner* — Christian Chace
*Assistant Examiner* — Jordan S Fei
(74) *Attorney, Agent, or Firm* — Seed IP Law Group LLP

(57) ABSTRACT

A driving support device includes an image output unit, an operation signal input unit, and a command output unit. The image output unit outputs an image information including a vehicle object representing a vehicle and a peripheral situation of the vehicle, to a display unit. The operation signal input unit receives an operation signal of a user with respect to the vehicle object in an image displayed on the display unit. The command output unit outputs an automatic driving control command corresponding to the received operation signal, to an automatic driving controller that controls automatic driving. If the operation signal input unit receives an operation signal of the user touching the vehicle object in the image displayed on the display unit, the image output unit outputs image information to the display unit in a selectable state, the image information including a plurality of operations automatically executable by the vehicle or a plurality of regions where the vehicle is movable when the vehicle object is touched.

13 Claims, 11 Drawing Sheets

(51) Int. Cl.

| | | |
|---|---|---|
| *G05D 1/00* | (2006.01) | |
| *G06F 3/0488* | (2013.01) | |
| *B60K 35/00* | (2006.01) | |
| *B60K 37/06* | (2006.01) | |
| *G08G 1/0962* | (2006.01) | |
| *G08G 1/16* | (2006.01) | |
| *B60W 50/14* | (2012.01) | |
| *G06F 3/0481* | (2013.01) | |
| *G06F 3/0484* | (2013.01) | |
| *G06F 3/0486* | (2013.01) | |

(52) U.S. Cl.
CPC ............. *B60W 30/18154* (2013.01); *B60W 30/18163* (2013.01); *B60W 50/14* (2013.01); *G05D 1/0088* (2013.01); *G06F 3/0488* (2013.01); *G08G 1/0962* (2013.01); *G08G 1/167* (2013.01); *B60K 2370/11* (2019.05); *B60K 2370/115* (2019.05); *B60K 2370/1438* (2019.05); *B60K 2370/166* (2019.05); *B60K 2370/171* (2019.05); *B60K 2370/175* (2019.05); *B60W 2050/146* (2013.01); *B60W 2540/04* (2013.01); *G06F 3/0486* (2013.01); *G06F 3/04817* (2013.01); *G06F 3/04842* (2013.01)

(56) References Cited

U.S. PATENT DOCUMENTS

| | | | |
|---|---|---|---|
| 2010/0030462 A1 | 2/2010 | Iwaji et al. | |
| 2011/0251768 A1* | 10/2011 | Luo | B60W 30/12 701/70 |
| 2012/0022716 A1 | 1/2012 | Kitahama et al. | |
| 2012/0293438 A1* | 11/2012 | Chaudhri | G06F 3/04883 345/173 |
| 2014/0358417 A1* | 12/2014 | Lavoie | G01C 21/165 701/300 |
| 2015/0032290 A1 | 1/2015 | Kitahama et al. | |
| 2016/0195407 A1 | 7/2016 | Sasaki | |
| 2017/0151958 A1* | 6/2017 | Sakuma | B60W 50/10 |

FOREIGN PATENT DOCUMENTS

| | | |
|---|---|---|
| JP | 2005-041433 | 2/2005 |
| JP | 2006-284218 | 10/2006 |
| JP | 2008-032629 | 2/2008 |
| JP | 2008-072412 | 3/2010 |
| JP | 2008-099483 | 5/2010 |
| JP | 2010-198578 | 9/2010 |
| JP | 2012-006590 A | 1/2012 |
| JP | 2015-011458 | 1/2015 |
| JP | 2015-049221 | 3/2015 |
| JP | 2015-081057 A | 4/2015 |
| WO | 2015/029181 | 3/2015 |
| WO | 2015/137012 | 9/2015 |
| WO | 2015/141308 | 9/2015 |

\* cited by examiner

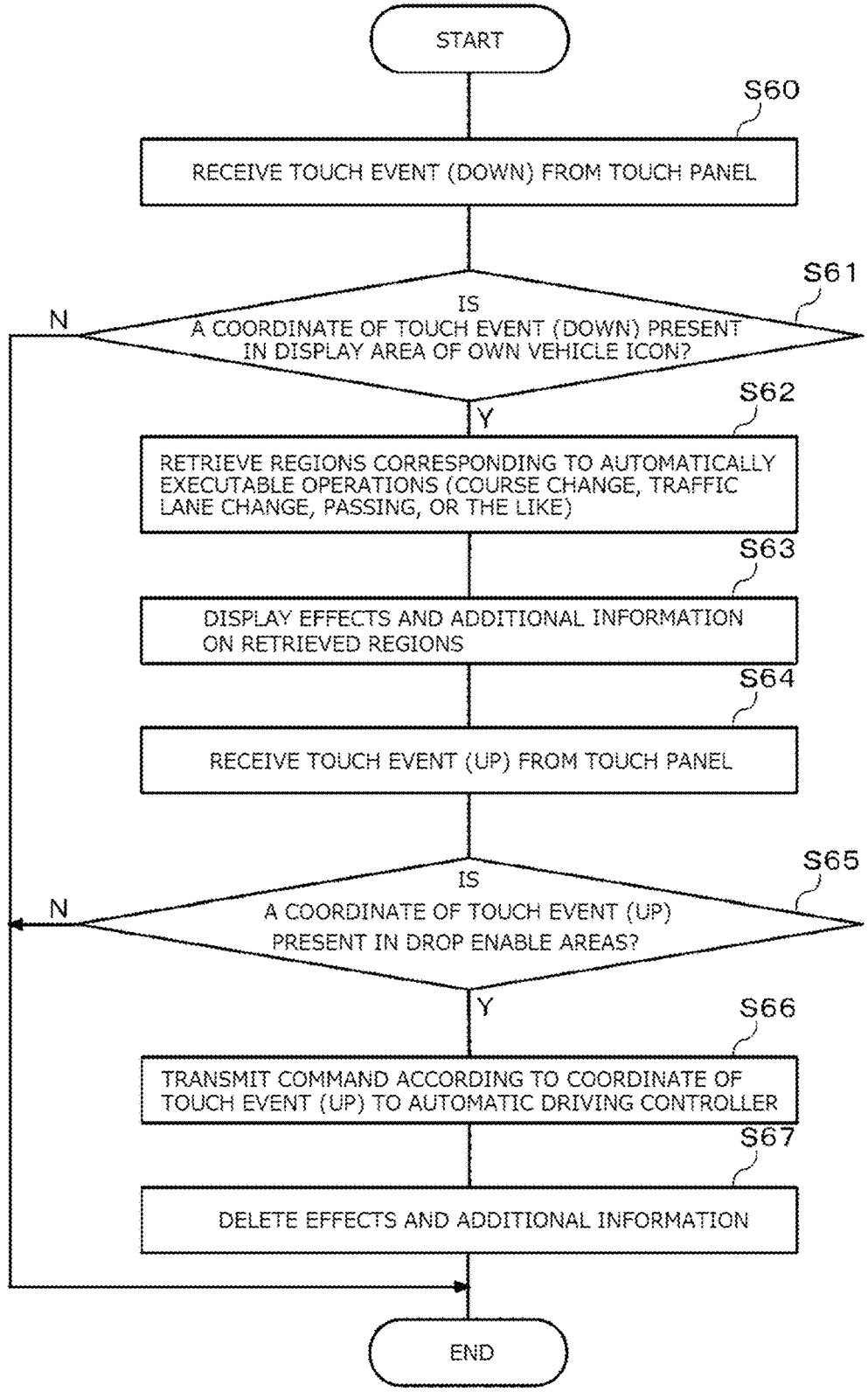

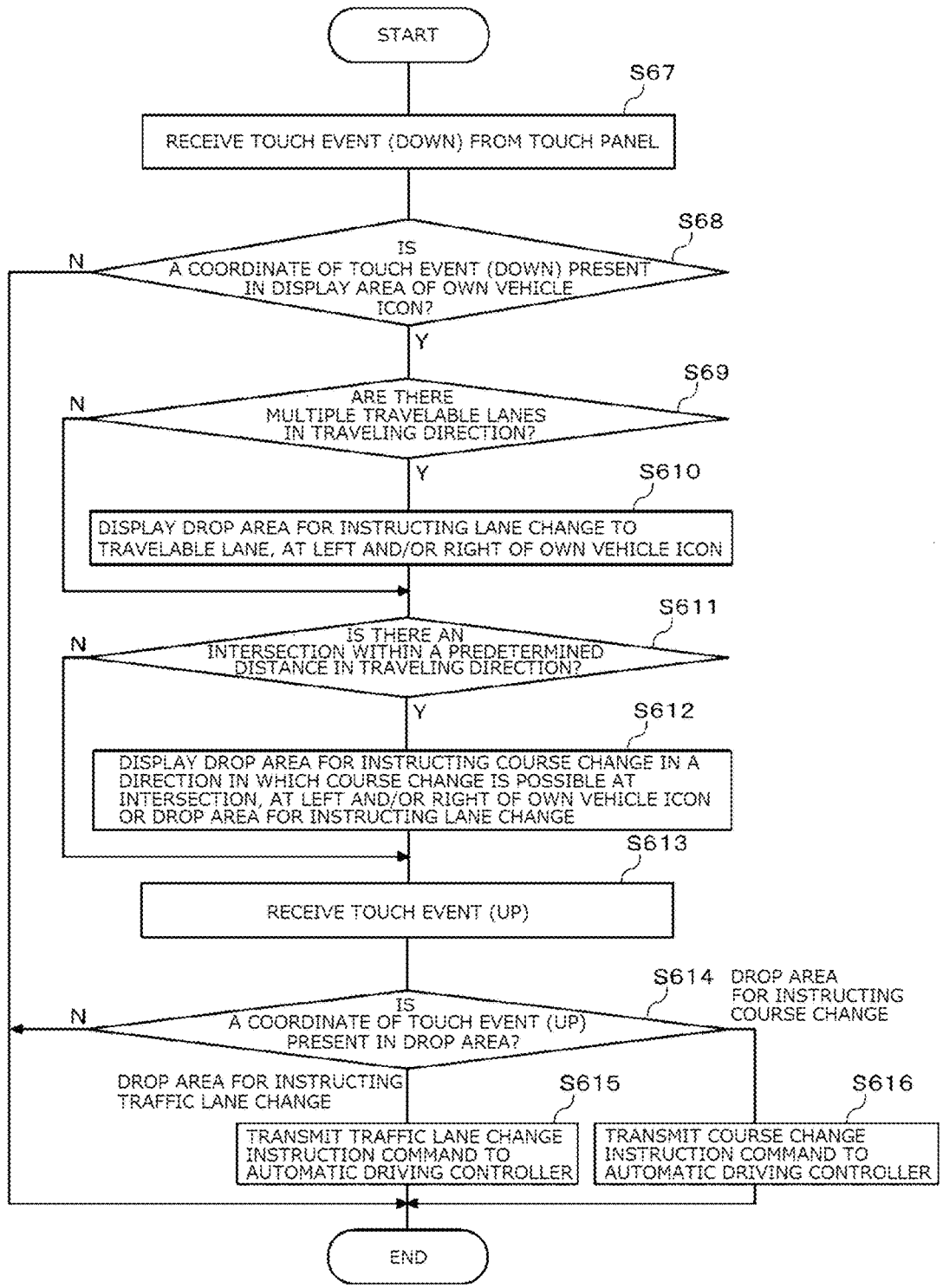

US 10,435,033 B2

DRIVING SUPPORT DEVICE, DRIVING SUPPORT SYSTEM, DRIVING SUPPORT METHOD, AND AUTOMATIC DRIVE VEHICLE

CROSS-REFERENCE TO RELATED APPLICATIONS

This application is a U.S. national stage application of the PCT International Application No. PCT/JP2016/003384 filed on Jul. 19, 2016, which claims the benefit of foreign priority of Japanese patent application No. 2015-152852 filed on Jul. 31, 2015, the contents all of which are incorporated herein by reference.

TECHNICAL FIELD

The present disclosure relates to a technique that supports a driving operation instruction of a driver to a vehicle during automatic driving.

BACKGROUND

In recent years, developments in automatic driving have progressed. For automatic driving, automation levels defined in 2013 by the National Highway Traffic Safety Administration (NHTSA) are classified as no automation (level 0), specific-function automation (level 1), complex-function automation (level 2), semi-automatic driving (level 3), and fully-automatic driving (level 4). Level 1 is a driving support system that automatically performs one of acceleration, deceleration, and steering, and level 2 is a driving support system that automatically performs two or more of acceleration, deceleration, and steering in coordination. In all cases, a driver is required to be involved in a driving operation. Automation level 4 is a fully-automatic driving system that automatically performs all of acceleration, deceleration, and steering, and thus a driver is not involved in a driving operation. Automation level 3 is a semi-fully-automatic driving system that automatically performs all of acceleration, deceleration, and steering, but if necessary, a driving operation is performed by a driver.

As one aspect of automatic driving, an aspect in which a driver does not operate an existing driving operation unit such as a steering, an accelerator pedal, or the like but instructs a specific driving operation such as traffic lane change, passing, following traveling, or the like to a vehicle by issuing a command to a vehicle is considered. In this aspect, a user interface in which there are fewer erroneous operations is required.

SUMMARY

A driving support device according to an aspect of the present disclosure includes an image output unit, an operation signal input unit, and a command output unit. The image output unit outputs an image information including a vehicle object representing a vehicle and a peripheral situation of the vehicle, to a display unit. The operation signal input unit receives an operation signal of a user with respect to the vehicle object in an image displayed on the display unit. The command output unit outputs an automatic driving control command corresponding to the received operation signal, to an automatic driving controller that controls automatic driving. When the operation signal input unit receives an operation signal of the user touching the vehicle object in the image displayed on the display unit, the image output unit outputs image information to the display unit in a selectable state, the image information including a plurality of operations automatically executable by the vehicle or a plurality of regions where the vehicle is movable when the vehicle object is touched.

As another aspect of the present disclosure, an aspect in which a technical idea of the present disclosure is converted into a device, a system, a method, a program, a recording medium in which a program is recorded, and an automatic drive vehicle equipped therewith by arbitrarily combining the above components is also effective.

According to the present disclosure, a driver can intuitively and conveniently instruct a specific driving operation to a vehicle.

BRIEF DESCRIPTION OF DRAWINGS

FIG. 6 is a flowchart illustrating a first example of issuing a command by a gesture operation.

FIG. 9 is a flowchart illustrating a second example of issuing a command by a gesture operation.

DESCRIPTION OF EMBODIMENTS

Prior to the description of an exemplary embodiment of the present disclosure, problems in a configuration of the related art are described. A driving support device in the related art displays a course guide. However, when a driver confirms the course and instructs a specific driving operation to a vehicle, the driver needs to operate each specific switch one by one, turn a steering wheel, or depress an accelerator pedal, and thus the operation becomes complicated. In addition, in the driving support device in the related art, the driver has to move the line of sight, and there is a possibility of an erroneous operation. Further, In a design in which each switch is designed for a specific driving operation such as lane change, passing, following traveling, or the like, the correspondence between a switch operation and automatic traveling control is not intuitive, and selecting an instruction among many switches or selecting a changed function with reduced switches according to a situation is a complex task. For this reason, in the driving support device in the related art, there is a problem in that a wide range of users including a person who has not been driving up to now, a person who wants to continue to drive even though the driving capability of the person has been reduced, or the like, cannot use an automatic driving vehicle without training.

The present disclosure has been made in consideration of such a situation, and provides a technique that allows a driver to intuitively and conveniently instruct a specific driving operation to a vehicle.

Figure 1:
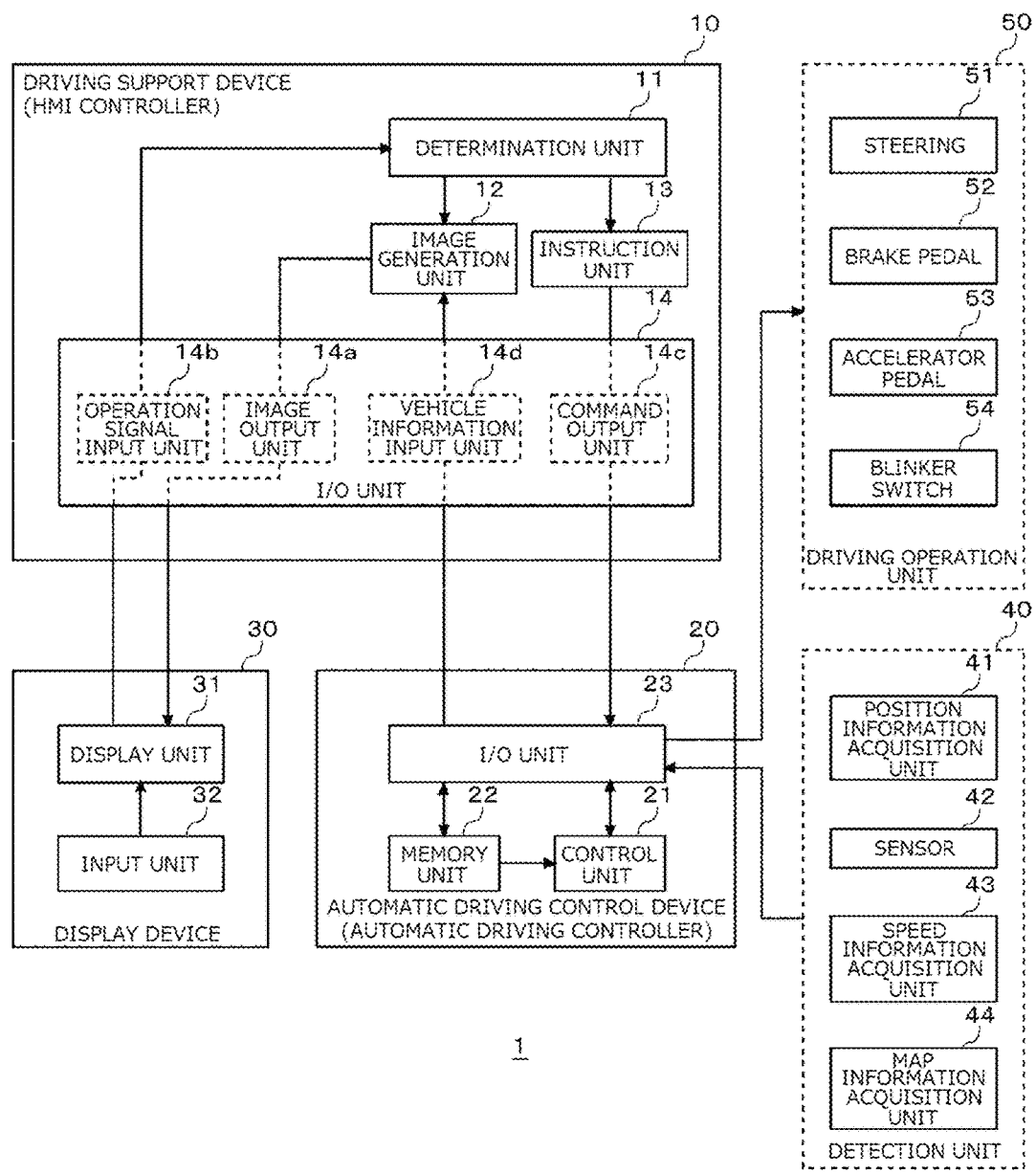
FIG. 1 is a block diagram illustrating a configuration of a vehicle according to an embodiment of the present disclosure.

Hereinafter, embodiments of the present disclosure will be described with reference to the drawings. FIG. 1 is a block diagram illustrating a configuration of vehicle 1 according to an embodiment of the present disclosure, and illustrates a configuration related to automatic driving. Vehicle 1 (an own vehicle) with an automatic driving mode includes driving support device (human-machine interface (HMI) controller) 10, automatic driving control device 20, display device 30, detection unit 40, and driving operation unit 50.

Display device 30 includes display unit 31 and input unit 32. Display device 30 may be a head unit such as a car navigation system, a display audio, or the like. Display device 30 may be a portable terminal device such as a smart phone, a tablet, or the like, or a dedicated console terminal device.

Display unit 31 is a liquid crystal display, an organic electroluminescence (EL) display, or a heads-up display (HUD). Input unit 32 is a user interface that receives an input of a user. Display unit 31 and input unit 32 may be an integrated touch panel display. As an integrated touch panel display, such as a proximity touch panel that can detect proximity of a hand on a touch panel or a touch pad, or a position of a finger by a hover operation, a touch panel that receives a gesture input at a position apart from a predetermined distance from the display unit may be used. Input unit 32 may have an input device such as a mouse, a stylus pen, a trackball, or the like for assisting the gesture input. A pen that emits visible light or infrared light may also be used as an input device.

Display unit 31 and input unit 32 may be physically separated from each other, instead of being an integrated touch panel display. For example, input unit 32 includes a sensor such as a camera or the like, and may be a non-contact type input device that allows a gesture operation input in the air. As an operation method of the non-contact type input device, for example, an operation method that starts to drag with a gesture by pointing a target with a finger and making a thumb finger and an index finger close and shut together, and ends to drag with a gesture by making a thumb finger and an index finger separated from each other, is considered.

Driving support device 10 and display device 30 may be connected to each other by wire communication such as a dedicated line, a controller area network (CAN), or the like, or may be connected to each other by wire communication or wireless communication such as universal serial bus (USB), Ethernet (registered trademark), Wi-Fi (registered trademark), Bluetooth (registered trademark), or the like.

Detection unit 40 includes position information acquisition unit 41, sensor 42, speed information acquisition unit 43, and map information acquisition unit 44. Position information acquisition unit 41 acquires a current position of vehicle 1 from a global positioning system (GPS) receiver. Sensor 42 is a general term for various sensors for detecting a situation outside the vehicle and a state of vehicle 1. As a sensor for detecting a situation outside the vehicle, for example, a camera, a millimeter wave radar, a light detection and ranging (laser imaging detection and ranging, LIDAR), a temperature sensor, a pressure sensor, a humidity sensor, an illumination sensor, or the like is mounted. As a situation outside the vehicle, a road situation in which the own vehicle travels or an environmental situation including weather, and an own vehicle peripheral situation are considered. Any information outside the vehicle that can be detected by the sensor may be considered. As a sensor for detecting a state of vehicle 1, for example, an acceleration sensor, a gyro sensor, a geomagnetic sensor, an inclination sensor, or the like is mounted. Speed information acquisition unit 43 acquires the current speed of vehicle 1 from a vehicle speed sensor. Map information acquiring unit 44 acquires map information around the current position of vehicle 1 from a map database. Map database may be recorded on a recording medium in vehicle 1, or may be downloaded from a map server via a network in use.

Detection unit 40 and automatic driving control device 20 are connected to each other by wire communication such as a dedicated line, a USB, an Ethernet (registered trademark), a controller area network (CAN), or the like. A configuration in which data acquired and detected by detection unit 40 is directly output from detection unit 40 to driving support device 10 may be employed.

Driving operation unit 50 includes steering 51, brake pedal 52, accelerator pedal 53, and blinker switch 54. In an automatic driving mode according to the present embodiment, acceleration, deceleration, steering, and blinker blink are a target of automatic control by automatic driving control device 20. FIG. 1 shows an operation unit when these controls are performed manually. Information, which indicates that driving operation unit 50 is slightly moved by a driver in a manual way, may output to driving support device 10.

Steering 51 is an operation unit for steering the vehicle. When steering 51 is rotated by a driver, the traveling direction of the vehicle is controlled through a steering actuator. The steering actuator can be electronically controlled by a steering electronic control unit (ECU).

Brake pedal 52 is an operation unit for decelerating vehicle 1. When brake pedal 52 is depressed by a driver, the vehicle is decelerated via a brake actuator. The brake actuator can be electronically controlled by a brake ECU.

Accelerator pedal 53 is an operation unit for accelerating vehicle 1. When accelerator pedal 53 is depressed by a driver, one or both of an engine rotation speed and a motor rotation speed are controlled via an accelerator actuator. In a pure gasoline engine car, the engine rotation speed is controlled. In a pure electric vehicle, the motor rotation speed is controlled. In a hybrid car, both of the engine rotation speed and the motor rotation speed are controlled. The accelerator actuator can be electronically controlled by one or both of an engine ECU and a motor ECU.

Blinker switch 54 is an operation unit for blinking a blinker so as to notify a course of the vehicle to the outside. When blinker switch 54 is turned on or turned off by a driver, the blinker is turned on or turned off via a blinker controller. The blinker controller includes a drive circuit such as a relay controlling power supply to a blinker lamp, or the like.

Each of the steering ECU, the brake ECU, the engine ECU, the motor ECU, and the blinker controller and automatic driving control device 20 are connected to each other by wired communication such as a CAN, a dedicated line, or the like. Each of the steering ECU, the brake ECU, the engine ECU, the motor ECU, and the blinker controller transmits a state signal indicating the state of each of a steering, a brake, an engine, a motor, and a blinker lamp to automatic driving control device 20, respectively.

In the automatic driving mode, the steering ECU, the brake ECU, the engine ECU, and the motor ECU drive each actuator according to a control signal supplied from automatic driving control device 20. In a manual driving mode, a configuration in which an instruction is directly transferred from each of steering 51, brake pedal 52, and accelerator pedal 53 to each actuator in a mechanical way may be employed, or a configuration in which electronic control intervenes via each ECU may be employed. The blinker controller turns on or turns off the blinker lamp according to the control signal supplied from automatic driving control device 20 or an instruction signal from blinker switch 54.

Automatic driving control device 20 is an automatic driving controller that has an automatic driving control function, and includes control unit 21, memory unit 22, and input-output unit (I/O unit) 23. The configuration of control unit 21 may be realized by cooperation between hardware resources and software resources or only hardware resources. As the hardware resources, a processor, a read only memory (ROM), a random access memory (RAM), and a large scale integrated (LSI) circuit can be used, and as software resources, an operating system, an application, and a program such as a firmware or the like can be used. Memory unit 22 includes a non-volatile recording medium such as a flash memory or the like. Input-output unit 23 executes various communication controls according to various communication formats.

Control unit 21 calculates a control value for controlling a target of automatic control such as a traveling direction of vehicle 1 or the like by applying various parameter values collected from detection unit 40 and various ECUs to an automatic driving algorithm. Control unit 21 transfers the calculated control value to each ECU or controller of a control target. In the present embodiment, the control value is transferred to the steering ECU, the brake ECU, the engine ECU, and the blinker controller. In a case of an electric vehicle or a hybrid car, the control value is transferred to the motor ECU instead of the engine ECU or in addition to the engine ECU.

Driving support device 10 is a human machine interface (HMI) controller for performing an interface function between vehicle 1 and a driver, and includes determination unit 11, image generation unit 12, instruction unit 13, and input-output unit 14. Determination unit 11, image generation unit 12, and instruction unit 13 can be realized by cooperation between hardware resources and software resources, or only hardware resources. As the hardware resources, a processor, a ROM, a RAM, and other LSI circuits can be used, and as software resources, an operating system, an application, and a program such as a firmware or the like can be used. Input-output unit 14 performs various communication control according to various communication formats. Input-output unit 14 includes image output unit 14a, operation signal input unit 14b, command output unit 14c, and vehicle information input unit 14d. Image output unit 14a outputs an image generated by image generation unit 12 to display unit 31. Operation signal input unit 14b receives an operation signal that is input from input unit 32 by an operation of a driver, a passenger, or a user outside the vehicle, and outputs the operation signal to determination unit 11. Command output unit 14c outputs the command instructed by instruction unit 13 to automatic driving controller 20. Vehicle information input unit 14d receives detection data acquired by detection unit 40 or vehicle information generated by automatic driving controller 20, and outputs the detection data or the vehicle information to image generation unit 12.

Automatic driving controller 20 and HMI controller 10 are directly connected to each other by a signal line. A configuration in which automatic driving controller 20 and HMI controller 10 are connected to each other via a CAN may be employed. A configuration in which automatic driving controller 20 and HMI controller 10 are integrated into one controller may be also employed.

Figure 2:
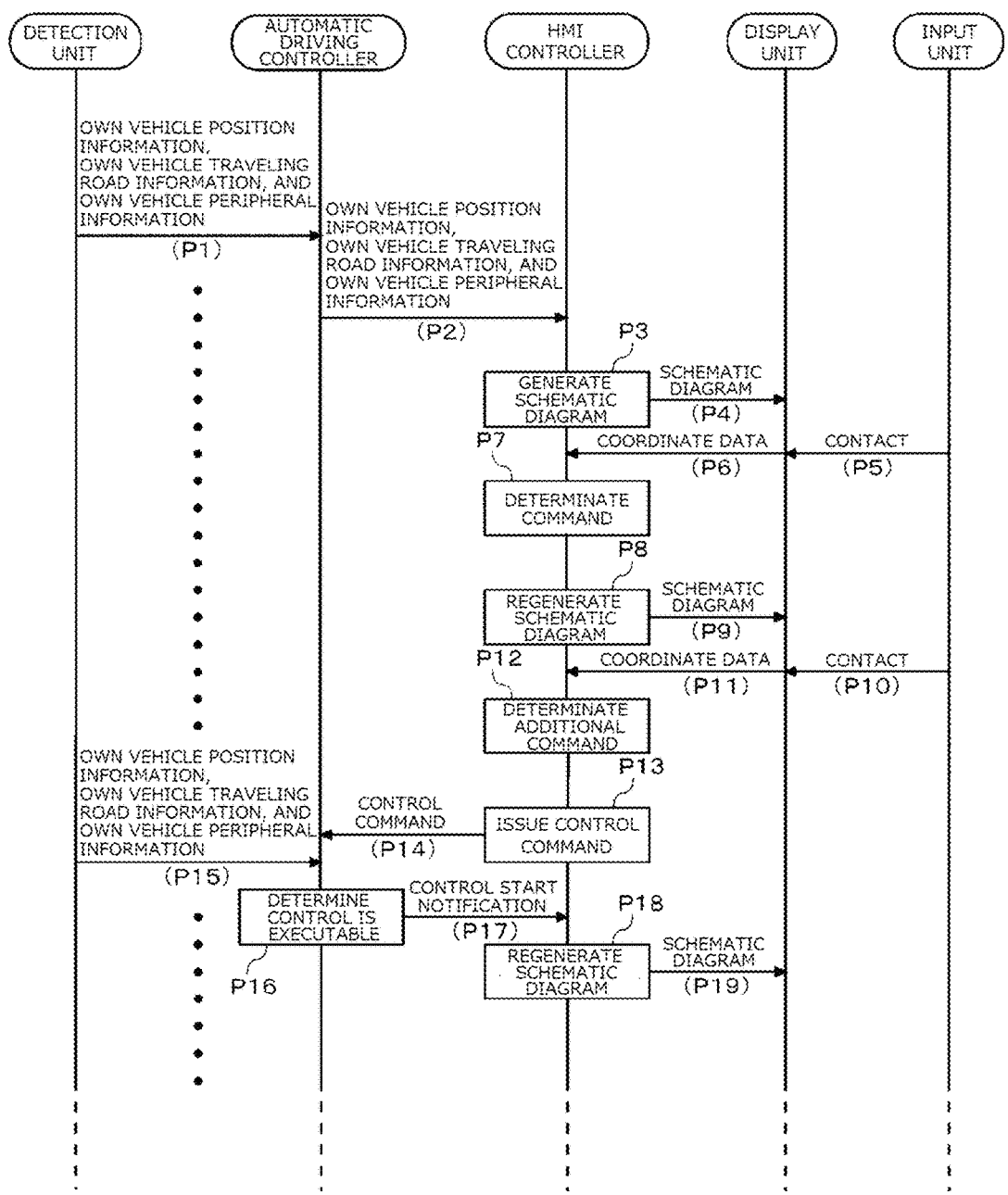
FIG. 2 is a diagram illustrating an example of a basic sequence of a detection unit, an automatic driving controller, a HMI controller, a display unit, and an input unit in FIG. 1.

FIG. 2 is a diagram illustrating an example of a basic sequence of detection unit 40, automatic driving controller 20, HMI controller 10, display unit 31, and input unit 32 in FIG. 1. Detection unit 40 detects own vehicle position information, own vehicle traveling road information, and own vehicle peripheral information, and outputs the detected information to automatic driving controller 20 (P1). Automatic driving controller 20 outputs the own vehicle position information acquired from detection unit 40, the own vehicle traveling road information, and the own vehicle peripheral information to HMI controller 10 (P2). HMI controller 10 generates a schematic diagram including the own vehicle and the own vehicle peripheral situation based on the information acquired from automatic driving controller 20 (P3). HMI controller 10 outputs the generated schematic diagram to display device 30, and the schematic diagram is displayed on display unit 31 (P4).

A user who views the schematic diagram displayed on display unit 31 comes into contact with input unit 32 (P5). Display unit 31 outputs coordinate data at a position at which the contact is detected to HMI controller 10 (P6). HMI controller 10 determines the type of the command based on the coordinate data acquired from display device 30 (P7). HMI controller 10 receives an additional input until a certain period of time has elapsed (P8 to P12). After determination of the command, HMI controller 10 regenerates a schematic diagram indicating that the command is being instructed (P8). HMI controller 10 outputs the regenerated schematic diagram to display device 30, and the regenerated schematic diagram is displayed on display unit 31 (P9). In a case where the command corresponding to the gesture operation by the touch of a user does not exist, HMI controller 10 generates a schematic diagram including an error message, and outputs the schematic diagram to display device 30, and the schematic diagram is displayed on display unit 31.

When a user who views the schematic diagram indicating that the command is being instructed comes into contact with input unit 32 (P10), display unit 31 outputs the coordinate data at a position at which the contact is detected to HMI controller 10 (P11). HMI controller 10 performs additional command processing based on the coordinate data acquired from display device 30 (P12). In a case where there is no input of a new command in the additional command processing (P12), HMI controller 10 issues a command determined in P7 to automatic driving controller 20 (P13 and P14). In a case where a new command is input in the additional command processing (P12), HMI controller 10 issues a new command to automatic driving controller 20. In a case where the new command that is input is a cancel command, HMI controller 10 cancels the issue of a command. Processing of overwriting and canceling of the original command due to a new command may be performed by automatic driving controller 20. In this case, after the command determination processing in P7 and P12, HMI controller 10 transmits the command to automatic driving controller 20, and performs processing of overwriting and canceling according to an internal state of automatic driving controller 20.

Detection unit 40 periodically detects the own vehicle position information, the own vehicle traveling road information, and the own vehicle peripheral information, and outputs the information to automatic driving controller 20 (P15). Automatic driving controller 20 determines whether or not control instructed by the command issued from HMI controller 10 is executable (P16), based on the corresponding information. In a case where it is determined that the control is executable, automatic driving controller 20 outputs a control start notification to HMI controller 10 (P17). When the control start notification is received, HMI controller 10 regenerates a schematic diagram including a message indicating that the control is being performed (P18). HMI controller 10 outputs the regenerated schematic diagram to display device 30, and the regenerated schematic diagram is displayed on the display unit 31 (P19). Although not illustrated, automatic driving controller 20 calculates a specific control value for controlling driving operation unit 50 that performs the issued command by applying various parameter values collected from detection unit 40 or various ECUs to an automatic driving algorithm, and transfers the control value to the ECU or controller of each control target, the control value being an automatic control target such as a traveling direction of vehicle 1. Driving operation unit 50 operates based on the specific control value. When a predetermined control value or the detection data acquired by detection unit 40 is a predetermined value (in a predetermined range), and when automatic driving controller 20 determines that a condition of the issued command is satisfied, driving operation unit 50 determines that executing of the command is completed.

When a control completion notification is received from automatic driving controller 20, HMI controller 10 generates a schematic diagram including a message indicating that control is completed, and outputs the generated schematic diagram to display device 30. During a period for which an operation from a user is not received, HMI controller 10 generates a schematic diagram including a message indicating that an operation is not received, and outputs the generated schematic diagram to display device 30.

Figure 3:
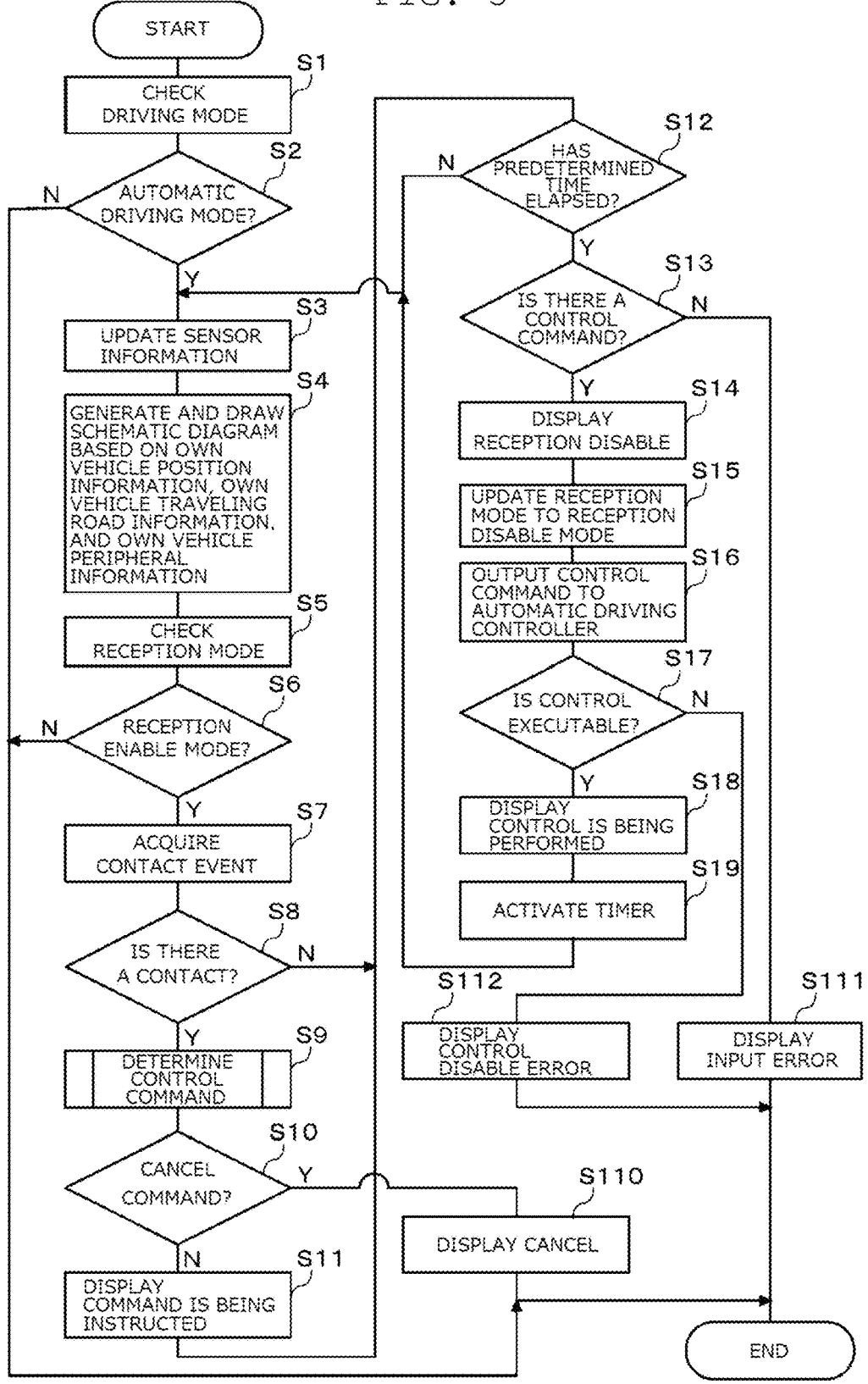
FIG. 3 is a diagram illustrating an example of a basic flowchart for explaining processing in the HMI controller in FIG. 1.

FIG. 3 is a diagram illustrating an example of a basic flowchart for explaining processing of HMI controller 10 in FIG. 1. Determination unit 11 of HMI controller 10 checks whether or not a driving mode is an automatic driving mode or a manual driving mode (S1). In the manual driving mode (N in S2), the process ends. In a case of the automatic driving mode (Y in S2), processing is performed as follows.

Sensor information that is input from detection unit 40 to automatic driving controller 20 is updated at any time (S3). Image generation unit 12 of HMI controller 10 generates a schematic diagram including the own vehicle and the own vehicle peripheral situation based on the own vehicle position information, the own vehicle traveling road information, and the own vehicle peripheral information that are input from automatic driving controller 20, and draws the generated schematic diagram on display unit 31 (S4). Determination unit 11 checks whether or not a reception mode is a reception enable mode in which an operation from a user can be received or a reception disable mode in which an operation from a user cannot be received (S5). In a case where the reception mode is the reception disable mode (N in S6), the process ends. In a case where the reception mode is the reception enable mode (Y in S6), determination unit 11 determines whether or not there is a contact to input unit 32 by a user (S7). In a case where there is no contact to input unit 32 by a user (N in S8), a predetermined-time elapse determination process (S12) to be described later is performed. In a case where there is a contact to input unit 32 by a user (Y in S8), determination unit 11 determines a control command corresponding to a gesture operation input by a user (S9). The details of the determination processing will be described later.

In a case where the control command determined in step S9 is not a cancel command (N in S10), image generation unit 12 displays that the command is being instructed on display unit 31 (S11). When a predetermined time has elapsed after the control command is determined (Y in S12), in a case where there is a control command determined in step S9 (Y in S13), operation reception disable is displayed on display unit 31 (S14), determination unit 11 updates the reception mode from the reception enable mode to the reception disable mode (S15), and instruction unit 13 outputs the determined control command to automatic driving controller 20 (S16). Until a predetermined time has elapsed (N in S12), the process transitions to step S3.

In step S10, in a case where the determined control command is a cancel command (Y in S10), cancel is displayed (S110), and the process ends. In step S13, in a case where there is no control command determined in step S9, an input error is displayed (S111), and the process ends. Automatic driving controller 20 periodically detects the own vehicle position information, the own vehicle traveling road information, and the own vehicle peripheral information from detection unit 40. Since the own vehicle peripheral situation constantly changes, after the control command is output to automatic driving controller 20, there is a case where it is determined that the control command is not executable. For example, after a following instruction, there is a case where other cars interrupt between the own vehicle and another vehicle. In a case where it is determined that the control command is executable by automatic driving controller 20 (Y in S17), image generation unit 12 displays that the control is being performed on display unit 31 (S18), and starts counting by activating a timer (S19). In a case where it is determined that the control is not executable by automatic driving controller 20 (N in S17), image generation unit 12 displays a control disable error on display unit 31 (S112).

Figure 4:
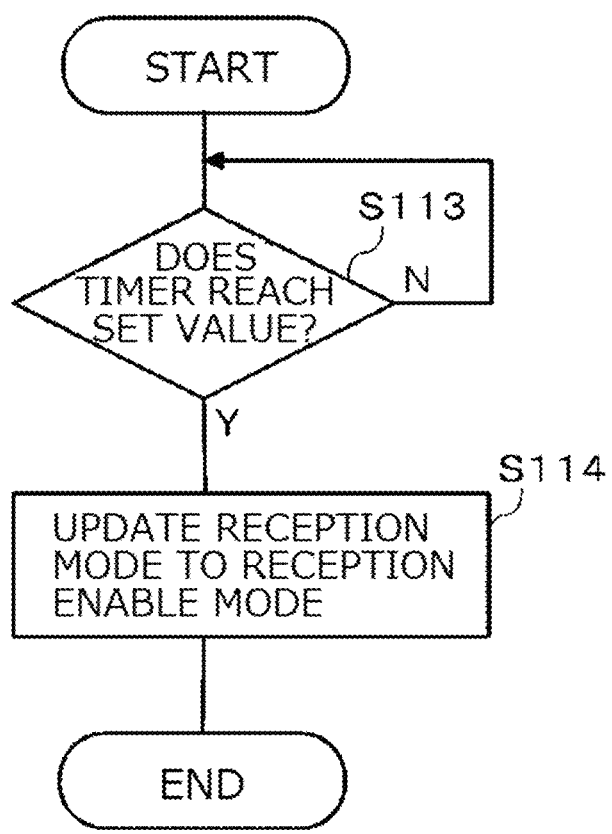
FIG. 4 is a flowchart for explaining update processing of a reception mode.

FIG. 4 is a flowchart for explaining update processing of a reception mode. When a count value of the timer reaches a set value (for example, 10 seconds) (Y in S113), determination unit 11 of HMI controller 10 updates the reception mode from the reception disable mode to the reception enable mode (S114). The count value of the timer may be changed according to the own vehicle peripheral situation. When a notification indicating completion of the control is received from automatic driving controller 20, or when it is determined that the control according to the control command is completed based on behavior of vehicle 1, determination unit 11 may update the reception mode from the reception disable mode to the reception enable mode.

Figure 5:
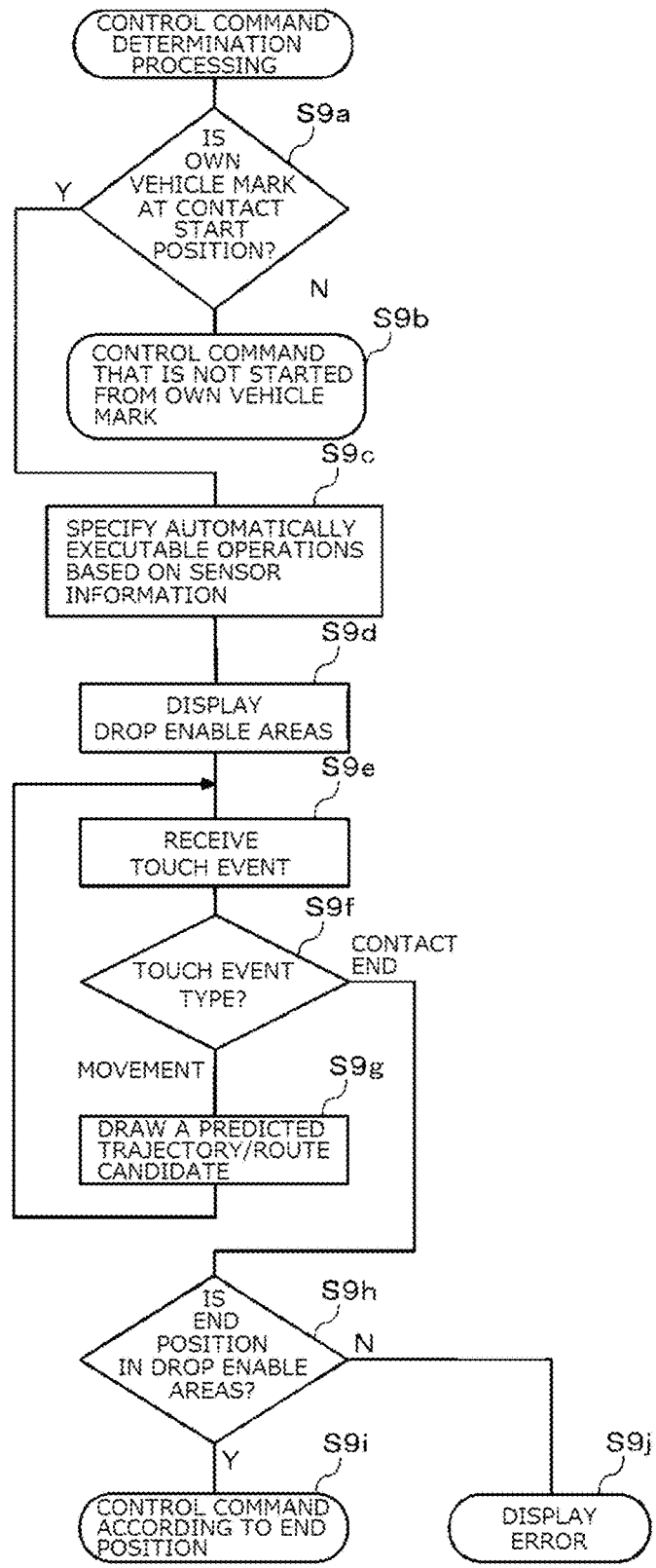
FIG. 5 is a flowchart illustrating an example of determination processing in a case where a gesture operation is input from a driver in step S9 of FIG. 3.

FIG. 5 is a flowchart illustrating an example of determination processing in a case where a gesture operation is input from a driver in step S9 of FIG. 3. Determination unit 11 of HMI controller 10 determines whether or not an own vehicle mark is present at a contact start position (S9a). In a case where the own vehicle mark is not present at the contact start position (N in S9a), determination unit 11 determines that the gesture operation is a control command other than the control command corresponding to a gesture operation starting from the own vehicle mark (S9b). In a case where the own vehicle mark is present at the contact start position (Y in S9a), determination unit 11 specifies automatically-executable operations, based on the own vehicle position information, the own vehicle traveling road information, and the own vehicle peripheral information that are input from automatic driving controller 20 and based on sensor information when the own vehicle mark is touched (S9c). For example, in a case where there are multiple traffic lanes in the same traveling direction, a traffic lane change operation is possible. In a case where there is a passing lane, a passing operation is possible. In a case where another vehicle is present in front of the own vehicle, a following traveling operation is possible. Even in a case where there are multiple traffic lanes in the same traveling direction, when another vehicle is present on another traffic lane and the another vehicle is positioned in the vicinity of the own vehicle, a traffic lane change operation for changing the traffic lane of the own vehicle to the traffic lane of the another vehicle, and a passing operation using the traffic lane of the another vehicle become non-executable operations until the own vehicle is at a distance from the anther vehicle.

Image generation unit 12 draws drop enable areas corresponding to the automatically executable operations in the schematic diagram, and displays the areas on display unit 31 (S9d). Determination unit 11 receives a touch event generated in input unit 32 (S9e), and determines the type of the touch event (S9f). In a case where the type of the touch event is a movement (movement in S9f), image generation unit 12 draws a predicted trajectory/route candidate of vehicle 1 in the schematic diagram, and the predicted trajectory/route candidate of vehicle 1 is displayed on display unit 31 (S9g). In a case where the type of the touch event is a contact end (contact end in S9f), determination unit 11 determines whether or not a contact end position is in drop enable areas (S9h). In a case where the contact end position is in drop enable areas (Y in S9h), determination unit 11 determines that the gesture operation is a control command corresponding to the area at which the own vehicle mark is dropped (S9i). In a case where the contact end position is outside drop enable areas (N in S9h), image generation unit 12 displays an error message on display unit 31 (S9j).

Hereinafter, a specific example of an expression method of the drop enable areas will be described. In the following examples, it is assumed that a touch panel display in which display unit 31 and input unit 32 are integrated is used.

FIG. 6 is a flowchart illustrating a first example of issuing a command by a gesture operation. Determination unit 11 of HMI controller 10 receives a touch event (DOWN) from the touch panel (S60). The touch event (DOWN) is an event representing a contact state change on the touch panel from a non-contact state to a contact state by a finger or a pen. Determination unit 11 determines whether or not a coordinate detected by the touch event (DOWN) is present in a display area of the own vehicle icon (S61). In a case where the coordinate detected by the touch event (DOWN) is present outside the display area of the own vehicle icon (N in S61), it is determined that the gesture operation is not a gesture operation starting from the own vehicle icon, and the process ends.

In a case where the coordinate detected by the touch event (DOWN) is present in the display area of the own vehicle icon (Y in S61), determination unit 11 specifies automatically-executable operations based on the own vehicle information and the peripheral information acquired from automatic driving controller 20, and retrieves regions corresponding to the operations (S62). Image generation unit 12 sets the retrieved regions as drop enable areas, and displays effects and/or additional information on the regions (S63). Determination unit 11 receives a touch event (UP) from the touch panel (S64). The touch event (UP) is an event representing a contact state change on the touch panel from a contact state to a non-contact state by a finger or a pen.

Determination unit 11 determines whether or not a coordinate detected by the touch event (UP) is present in the drop enable areas (S65). In a case where the coordinate detected by the touch event (UP) is present in the drop enable areas (Y in S65), instruction unit 13 issues a command corresponding to the coordinate detected by the touch event (UP) to automatic driving controller 20 (S66). Image generation unit 12 deletes effects and/or additional information in the schematic diagram (S67). In a case where the coordinate detected by the touch event (UP) is present outside the drop enable areas (N in S65), it is determined that the gesture operation is not a gesture operation starting from the own vehicle icon, and the process ends.

Figure 7A:
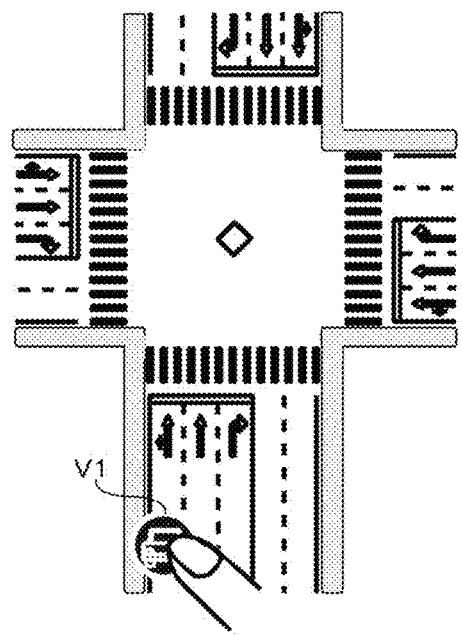
FIG. 7A is a diagram illustrating an example of a gesture operation according to the flowchart of FIG. 6.
Figure 7B:
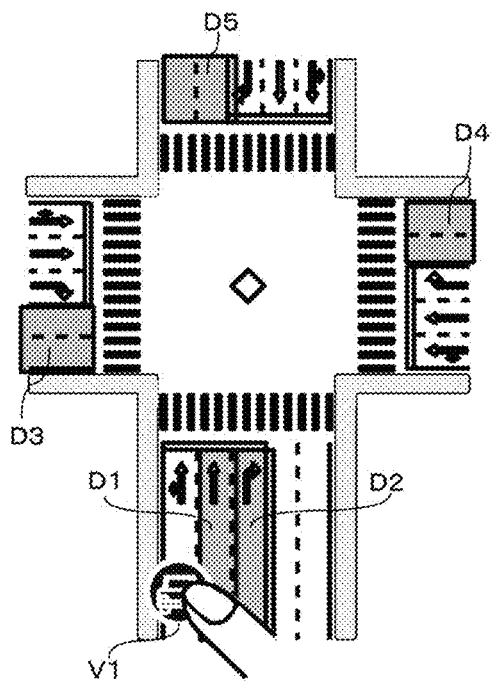
FIG. 7B is a diagram illustrating an example of a gesture operation according to the flowchart of FIG. 6.

FIG. 7A and FIG. 7B are diagrams illustrating an example of a gesture operation according to the flowchart of FIG. 6. In a schematic diagram illustrated in FIG. 7A, the own vehicle icon V1 and the peripheral situation of the own vehicle (including an intersection) are displayed. As display forms of the own vehicle and the peripheral situation, various display forms are considered. A real photographed image may be used, and a fine computer graphics (CG) image or an animation image may be used. Display of the own vehicle is not limited to an icon, and the own vehicle may be displayed as a more simple mark or character, or may be displayed as a real photographed image. In other words, there is no problem as long as the own vehicle is displayed on a screen as an object in any display form.

As illustrated in FIG. 7A, when a driver touches the own vehicle icon V1, as illustrated in FIG. 7B, the drop enable areas onto which the own vehicle icon V1 can be dropped are highlighted. In FIG. 7B, the drop enable areas onto which the own vehicle icon V1 can be dropped are five places of a straight-only lane area D1, a right-turn-only lane area D2, an after-left-turn lane area D3, an after-right-turn lane area D4, and an after-straight-pass-through-intersection lane area D5.

In a case where a driver drops the own vehicle icon V1 onto the straight-only lane area D1, a traffic lane change instruction command for instructing traffic lane change to the straight-only lane is issued. In a case where a driver drops the own vehicle icon V1 onto the right-turn-only lane area D2, a traffic lane change instruction command for instructing traffic lane change to the right-turn-only lane and a right turn instruction command are issued. In a case where a driver drops the own vehicle icon V1 onto the after-left-turn lane area D3, a left turn instruction command is issued. In a case where a driver drops the own vehicle icon V1 onto the after-right-turn lane area D4, a traffic lane change instruction command for instructing traffic lane change to the right-turn-only lane and a right turn instruction command are issued. In a case where a driver drops the own vehicle icon V1 onto the after-straight-pass-through-intersection lane area D5, an intersection straight pass instruction command is issued.

Figure 8A:
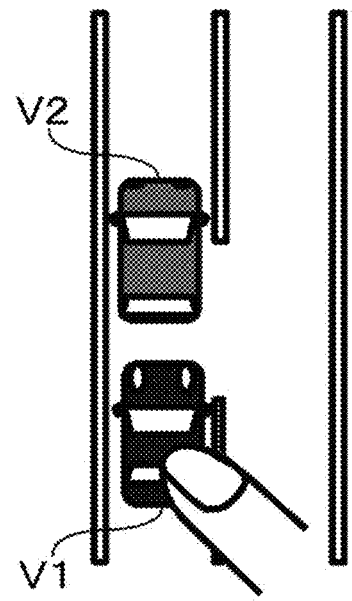
FIG. 8A is a diagram illustrating another example of a gesture operation according to the flowchart of FIG. 6.
Figure 8B:
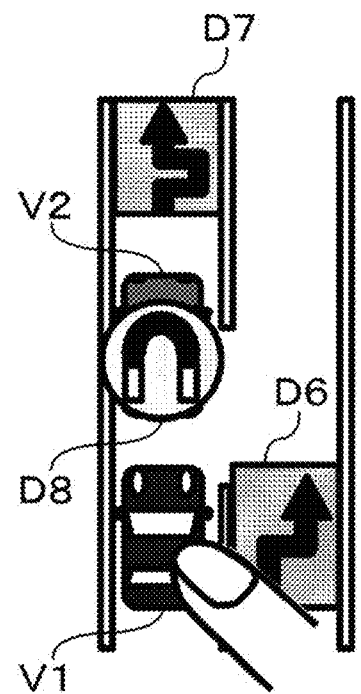
FIG. 8B is a diagram illustrating another example of a gesture operation according to the flowchart of FIG. 6.

FIG. 8A and FIG. 8B are diagrams illustrating another example of a gesture operation according to the flowchart of FIG. 6. As illustrated in FIG. 8A, when a driver touches the own vehicle icon V1, as illustrated in FIG. 8B, the drop enable areas onto which the own vehicle icon V1 can be dropped are highlighted. In FIG. 8B, the drop enable areas onto which the own vehicle icon V1 can be dropped are three places of an area D6 for instructing traffic lane change to a right traffic lane, an area D7 for instructing passing a preceding vehicle, and an area D8 for instructing traveling following a preceding vehicle. In each of the areas D6 to D8, icons for allowing a driver to intuitively recognize operation content are displayed. The operation content may be represented by a character or an arrow in addition the icon.

In a case where a driver drops the own vehicle icon V1 onto the area D6, a traffic lane change instruction command for instructing traffic lane change to a right traffic lane is issued. In a case where a driver drops the own vehicle icon V1 onto the area D7, a passing instruction command is issued. In a case where a driver drops the own vehicle icon V1 onto the area D8, a following instruction command for instructing traveling following a preceding vehicle is issued.

FIG. 9 is a flowchart illustrating a second example of issuing a command by a gesture operation. The second example is an example in which a flick input is used. Determination unit 11 of HMI controller 10 receives a touch event (DOWN) from the touch panel (S67). Determination unit 11 determines whether or not a coordinate detected by the touch event (DOWN) is present in a display area of the own vehicle icon (S68). In a case where the coordinate detected by the touch event (DOWN) is present outside the display area of the own vehicle icon (N in S68), it is determined that the gesture operation is not a gesture operation starting from the own vehicle icon, and the process ends.

In a case where the coordinate detected by the touch event (DOWN) is present in the display area of the own vehicle icon (Y in S68), determination unit 11 determines whether or not there are multiple travelable lanes in the traveling direction of the own vehicle (S69). In a case where there are multiple travelable lanes (Y in S69), image generation unit 12 generates a drop area for instructing lane change to the travelable lane at the left and/or right of the own vehicle icon, and displays the drop area on the touch panel (S610). In a case where there are not multiple travelable lanes (N in S69), the process of S610 is skipped.

Determination unit 11 determines whether or not there is an intersection within a predetermined distance in the traveling direction (S611). In a case where there is an intersection within a predetermined distance in the traveling direction (Y in S611), image generation unit 12 generates a drop area for instructing course change in a direction in which course change is possible at an intersection at the left and/or right of the own vehicle icon or the drop area for instructing lane change, and displays the drop area for instructing course change on the touch panel (S612). In a case where there is no intersection within a predetermined distance in the traveling direction (N in S611), the process of S612 is skipped.

Determination unit 11 receives a touch event (UP) from the touch panel (S613). Determination unit 11 determines whether or not a coordinate detected by the touch event (UP) is present in the drop area (S614). In a case where the coordinate detected by the touch event (UP) is not present in the drop area (N in S614), it is determined that the gesture operation is not a gesture operation starting from the own vehicle icon, and the process ends. In a case where the coordinate detected by the touch event (UP) is present in the drop area for instructing traffic lane change (drop area for instructing traffic lane change in S614), instruction unit 13 issues a traffic lane change instruction command to automatic driving controller 20 (S615). In a case where the coordinate detected by the touch event (UP) is present in the drop area for instructing course change (drop area for instructing course change in S614), instruction unit 13 issues a course change instruction command to automatic driving controller 20 (S616).

Figure 10A:
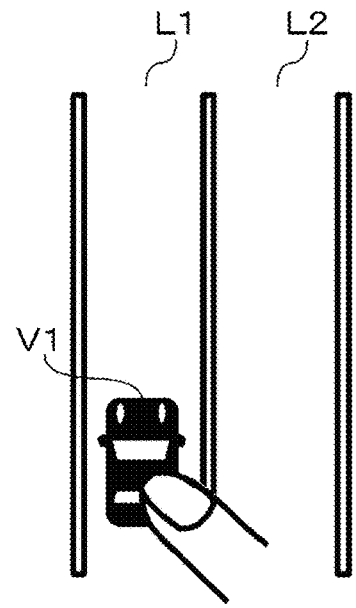
FIG. 10A is a diagram illustrating an example of a gesture operation according to the flowchart of FIG. 9.
Figure 10B:
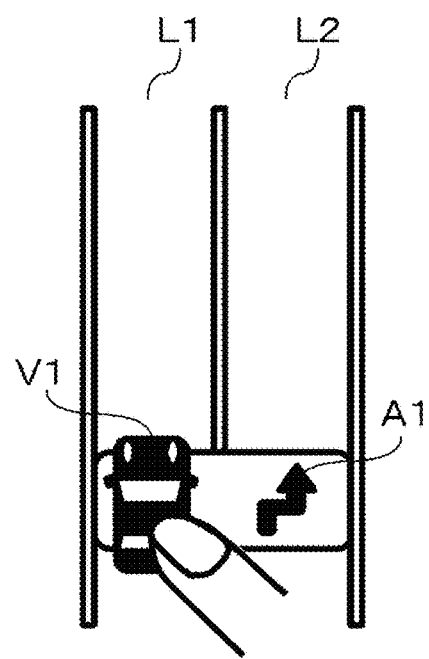
FIG. 10B is a diagram illustrating an example of a gesture operation according to the flowchart of FIG. 9.

FIG. 10A to FIG. 10D are diagrams illustrating an example of a gesture operation according to the flowchart of FIG. 9. In a case where a driver wants to change the traffic lane of the own vehicle from the first lane L1 to the second lane L2, as illustrated in FIG. 10A, a driver touches the own vehicle icon V1 on the first lane L1. When the own vehicle icon V1 is touched, as illustrated in FIG. 10B, the drop icon A1 for instructing traffic lane change to the second lane L2 is displayed. When a driver flicks the own vehicle icon V1 onto the drop icon A1, a traffic lane change instruction command for instructing traffic lane change to the second lane L2 is issued.

Figure 10C:
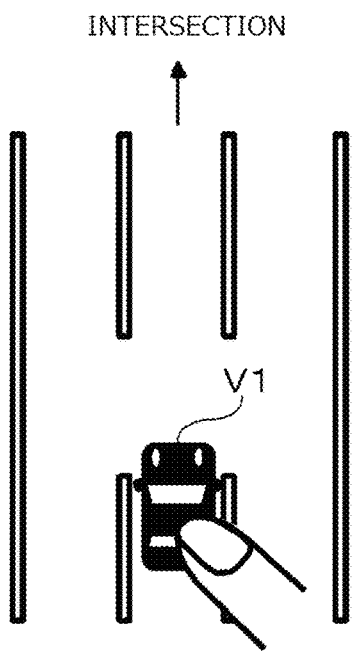
FIG. 10C is a diagram illustrating an example of a gesture operation according to the flowchart of FIG. 9.
Figure 10D:
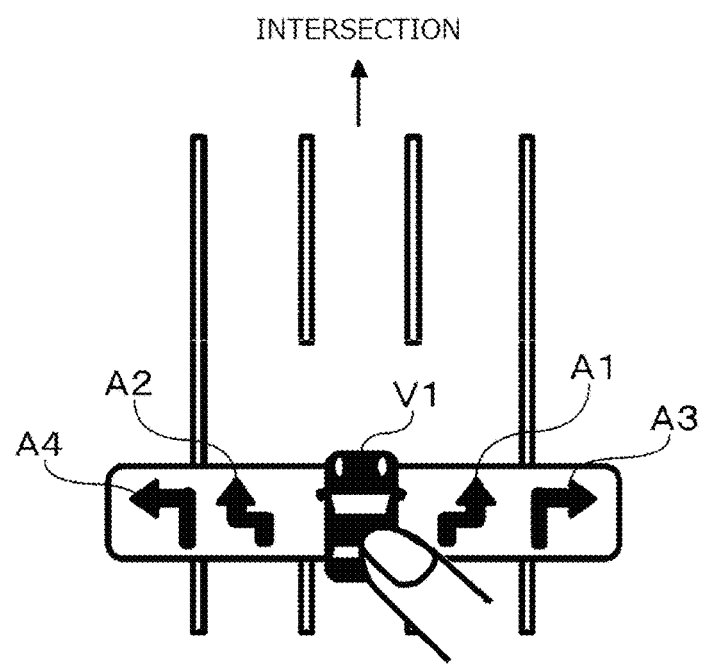
FIG. 10D is a diagram illustrating an example of a gesture operation according to the flowchart of FIG. 9.

As illustrated in FIG. 10C, in a case where there is an intersection ahead, when a driver touches the own vehicle icon V1, as illustrated in FIG. 10D, a drop icon A1 for instructing traffic lane change to a right lane, a drop icon A2 for instructing traffic lane change to a left lane, a drop icon A3 for instructing right turn, and a drop icon A4 for instructing left turn are displayed. A driver flicks the own vehicle icon V1 onto any one of the drop icons, and thus the corresponding command is issued.

In the above example, during a period for which the own vehicle icon is dragged and dropped, image generation unit 12 may hold the original image (own vehicle icon before movement) in the schematic diagram, and delete the original image when the own vehicle icon is dropped. During the period for which the own vehicle icon is dragged and dropped, image generation unit 12 may draw a trajectory of the drag of the own vehicle icon using a dotted line in the schematic diagram. During the period for which the own vehicle icon is dragged and dropped, image generation unit 12 may invert the color of the road, and return the color of the road to the original color thereof when the own vehicle icon is dropped.

During the period for which the own vehicle icon is dragged and dropped, when there is a drop disable area (an opposite traffic lane or the like) or when an operation (traffic lane change or the like) is disabled, image generation unit 12 may change (invert, thin, or the like) the color of the own vehicle icon. When the own vehicle icon is dropped, the own vehicle icon may return to the original position thereof, and an error message such as "operation disabled" may be displayed. Examples of a case where an operation is disabled includes approach of following vehicle, a traffic lane change prohibited area, exceeding of a limiting speed, or the like.

During the period for which the own vehicle icon is dragged and dropped, when an operation is disabled, image generation unit 12 may change (invert, thin, or the like) a color of a background such as a road or the like. When an operation is enabled, the color of the background is returned to the original color thereof. During the period for which the own vehicle icon is dragged and dropped, image generation unit 12 changes a color of the drop disable area. During the period for which the own vehicle icon is dragged and dropped, when there is a drop disable area or when an operation is disabled, image generation unit 12 performs notification using an error sound or a vibration.

When the drag of the own vehicle icon is started, in a case where the start of an operation is disabled, image generation unit 12 may change the color of the own vehicle icon. The drag operation (movement of the own vehicle icon) may be disabled. An error message such as "operation disabled" may be displayed. When the drag of the own vehicle icon is started, in a case where the start of an operation is disabled, image generation unit 12 may change the color of the background such as a road or the like. When an operation is enabled, the color of the background is returned to the original color thereof. When the drag of the own vehicle icon is started, in a case where the start of an operation is disabled, image generation unit 12 performs notification using an error sound or a vibration in a state where the drag operation (movement of the own vehicle icon) is disabled.

During a period for which the own vehicle icon is dropped and processing according to the control command is completed, image generation unit 12 may display a state of the own vehicle as a ghost, and display a trajectory of the own vehicle. During the period for which the own vehicle icon is dropped and the own vehicle completes processing according to the control command, image generation unit 12 may change a display state of the own vehicle icon (flashing, a color change, a size, a position, or the like). During the period for which the own vehicle icon is dropped and processing according to the control command is completed, determination unit 11 may queue a next instruction as an additional operation (reserve a control to be performed after the current control is completed). During dragging of the own vehicle icon, when the own vehicle icon is dropped, or during a period for which the own vehicle icon is dropped and processing according to a control command is established, a predicted trajectory may be received from automatic driving controller 20, and drawn on display unit 31. In a case where processing according to a control command is disabled temporarily because the own vehicle is waiting for the light to change or in a traffic lane change disable section, image generation unit 12 performs display such as "trying" until processing according to a control command is established, and may draw a predicted trajectory at a timing at which processing becomes executable. During dragging of the own vehicle icon, or during the period for which the own vehicle icon is dropped and processing according to a control command is established, image generation unit 12 may display an estimated required-time or a remaining required-time until the own vehicle icon is dropped and processing according to a control command is established. In a case where processing according to a control command is disabled temporarily, the control may be set in advance to be continued until the control is enabled or suspended and stopped. Since dragging is started accidentally or a cancel operation after dragging is required in some cases, a cancel drop region may be provided. After dragging of the own vehicle, when a driver drops the own vehicle icon onto a cancel drop region, issuing of a command can be cancelled.

As described above, according to the present embodiment, when a driver touches the own vehicle icon, selectable operations or moveable regions of the own vehicle icon are displayed in a manner that can be easily recognized by a driver, and thus it is possible to more intuitively perform an operation. In addition, it is possible to transfer the contents of various operations to automatic driving controller 20, by selecting the contents of operations or moving the icon to a moveable region, or by selecting or moving the icon displayed on the touch panel by a gesture. The gesture operation of the icon is a simple operation, and thus a driver is released from a driving operation in the related art such as turning of steering 51, depressing of accelerator pedal 53, or the like. For example, it is possible to easily instruct traffic lane change by displaying the schematic diagram including multiple lanes and the own vehicle icon and moving the own vehicle icon to another lane. A driver can perform a confirmation of a peripheral situation and an operation instruction on the touch panel at the same time, and thus the sight line of the driver does not move. Accordingly, it is possible to reduce the possibility of an erroneous operation and realize safer driving.

Other operations other than the above operations may be used, as an operation for displaying selectable operations and moveable regions and an operation for issuing a control instruction command. Although an example in which selectable operations and movable regions of the own vehicle icon are displayed is described, another vehicle, a pedestrian, an emergency vehicle, a specific region (a lane, a road shoulder, an intersection, or the like) may be a display object candidate. In this case, the content of an operation for the display object candidate that can be performed by the own vehicle, or a travelable trajectory to the display object candidate may be displayed. For example, when a driver touches and holds an another vehicle object, a menu for following/passing the own vehicle is displayed, and when a driver touches and holds a road shoulder or the like, an operation menu for row parking or parallel parking, or a travelable trajectory for reaching to various parking available spaces or a road shoulder may be displayed. Although a gesture operation is described as a drag-and-drop operation or the like, a touch-and-touch operation may be used. A predetermined gesture or operation is preferably used, but an operation that is customizable by a driver may be used. Further, in order to recognize the corresponding relationship of a gesture operation and a control command, a comment, an icon, or an arrow may be displayed by display unit 31, or a guide display or a voice guidance may be provided.

As above, the present disclosure has been described based on the embodiments. These embodiments have been presented by way of example only, and it should be understood by those skilled in the art that the embodiments can be modified in various forms by combining the respective elements or processing processes, and the modification examples are included in the scope of the present disclosure.

For example, although an example in which HMI controller 10 is implemented by a dedicated LSI is assumed, functions of HMI controller 10 may be realized using a control processing unit (CPU) in a portable device such as a smart phone or a tablet that is used as display device 30. In this case, a portable device that is used as display device 30 and automatic driving controller 20 are directly connected to each other. Functions of HMI controller 10 may be realized by a CPU in a head unit such as a car navigation device, a display audio, or the like. A dedicated LSI on which HMI controller 10 is mounted may be included in a head unit.

The embodiments may be specified by the following items.

[Item 1]

A driving support device (10) including:

an image output unit (14*a*) that outputs an image including an own vehicle object representing an own vehicle and a peripheral situation of the own vehicle, to a display unit (31);

an operation signal input unit (14*b*) that receives an operation of a user with respect to the own vehicle object in an image displayed on the display unit (31); and a command output unit (14*c*) that outputs a command corresponding to the received operation, to an automatic driving controller (20) that controls automatic driving, in which if the operation signal input unit (14*b*) receives an operation of the user touching the coordinate of the own vehicle object in the image displayed on the display unit (31), the image output unit (14*a*) outputs an image including selectable operation candidates or movable regions of the own vehicle object, to the display unit (31).

In this case, a user can intuitively and conveniently perform an operation related to automatic driving.

[Item 2]

The driving support device (10) according to Item 1, in which the image output unit (14*a*) outputs an image which highlights a traffic lane into which the own vehicle is permitted to enter, to the display unit (31).

In this case, it is possible to intuitively and conveniently perform an operation for instructing traffic lane change or course change.

[Item 3]

The driving support device (10) according to Item 1 or 2, in which the image output unit (14*a*) outputs an image including at least one operation candidate object representing at least one operation candidate that the own vehicle can execute based on the peripheral situation of the own vehicle, to the display unit (31), and if the operation signal input unit (14*b*) receives an operation of the user for moving the own vehicle object in the image displayed on the display unit (31) to a specific operation candidate object in the image, the command output unit (14*c*) outputs a command for instructing an operation represented by the specific operation candidate object, to the automatic driving controller (20).

In this case, a user can intuitively and conveniently perform an operation related to automatic driving.

[Item 4]

A driving support system (10, 30) including:

a display device (30) that displays an image; and a driving support device (10) that outputs an image to the display device (30);

in which the driving support device (10) includes:

an image output unit (14*a*) that outputs an image including an own vehicle object representing an own vehicle and a peripheral situation of the own vehicle, to the display device (30);

an operation signal input unit (14*b*) that receives an operation of a user with respect to the own vehicle object in the image displayed on the display device (30); and a command output unit (14*c*) that outputs a command corresponding to the received operation, to an automatic driving controller (20) that controls automatic driving, and if the operation signal input unit (14*b*) receives an operation of the user touching the coordinate of the own vehicle object in the image displayed on the display device (30), the image output unit (14*a*) outputs an image including selectable operation candidates or movable regions of the own vehicle object, to the display device (30).

In this case, a user can intuitively and conveniently perform an operation related to automatic driving.

[Item 5]

A driving support method including:

a step of outputting an image including an own vehicle object representing an own vehicle and a peripheral situation of the own vehicle, to a display unit (31);

a step of receiving an operation of a user with respect to the own vehicle object in an image displayed on the display unit (31); and a step of outputting a command corresponding to the received operation, to an automatic driving controller (20) that controls automatic driving, in which if an operation of the user touching the coordinate of the own vehicle object in the image displayed on the display unit (31) is received in the step of receiving the operation, in the step of outputting the image, an image including selectable operation candidates or movable regions of the own vehicle object is output to the display unit (31).

In this case, a user can intuitively and conveniently perform an operation related to automatic driving.

[Item 6]

A driving support program causing a computer to execute:

processing of outputting an image including an own vehicle object representing an own vehicle and a peripheral situation of the own vehicle, to a display unit (31);

processing of receiving an operation of a user with respect to the own vehicle object in an image displayed on the display unit (31); and processing of outputting a command corresponding to the received operation, to an automatic driving controller (20) that controls automatic driving, in which if an operation of the user touching the coordinate of the own vehicle object in the image displayed on the display unit (31) is received in the processing of receiving the operation, in the processing of outputting the image, an image including selectable operation candidates or movable regions of the own vehicle object is output to the display unit (31).

In this case, a user can intuitively and conveniently perform an operation related to automatic driving.

[Item 7]

An automatic drive vehicle (1) including:

a detection unit (40) that detects a peripheral situation of an own vehicle;

an image output unit (14*a*) that outputs an image including an own vehicle object representing the own vehicle and the peripheral situation of the own vehicle, to a display unit (31);

an operation signal input unit (14*b*) that receives an operation of a user with respect to the own vehicle object in an image displayed on the display unit (31);

a command output unit (14*c*) that outputs a command corresponding to the received operation; and an automatic driving controller (20) that executes the output automatic driving control command, in which if the operation signal input unit (14*b*) receives an operation of the user touching the coordinate of the own vehicle object in the image displayed on the display unit (31), the image output unit (14*a*) outputs an image to the display unit in a selectable state, the image including selectable operation candidates or movable regions of the own vehicle object that are based on the peripheral situation of the own vehicle, to the display unit (31).

In this case, a user can intuitively and conveniently perform an operation related to automatic driving.

The present disclosure can be used in a vehicle equipped with automatic driving mode.

The invention claimed is:

1. A driving support device which is included in a vehicle, the driving support device comprising:

an image output unit which, in operation, outputs image information including a vehicle object representing the vehicle and a peripheral situation of the vehicle, to a display unit;

an operation signal input unit which, in operation, receives an operation signal of a user with respect to the vehicle object in an image displayed on the display unit when a reception mode of the driving support device is set to a reception enable mode in which an operation from the user can be received; and a command output unit which, in operation, outputs an automatic driving control command corresponding to the received operation signal, to an automatic driving controller that controls automatic driving of the vehicle, wherein if the operation signal input unit receives an operation signal of the user touching the vehicle object in the image displayed on the display unit, the image output unit outputs image information including a plurality of operation candidate objects in a selectable state to the display unit, the plurality of operation candidate objects representing a plurality of operations that are automatically executable by the vehicle at a time of the user touching the vehicle object, the plurality of operation candidate objects being displayed in the image displayed on the display unit simultaneously, the plurality of operations including a traffic lane change, a passing of another vehicle, and a following of the another vehicle, the reception mode is changed from the reception enable mode to a reception disable mode in which an operation from the user cannot be received, in response to a predetermined time elapsing from when one of the plurality of operation candidate objects is selected, and the reception mode is changed from the reception disable mode to the reception enable mode in response to a notification indicating completion of an automatic driving control command corresponding to a selected operation candidate object of the plurality of operation candidate objects being received from the automatic driving controller, or it being determined that an automatic driving control command corresponding to a selected operation candidate object of the plurality of operation candidate objects is completed based on a behavior of the vehicle.

2. The driving support device of claim 1,
wherein the image output unit, in operation, outputs image information which highlights a traffic lane into which the vehicle is permitted to enter, to the display unit.

3. The driving support device of claim 1, wherein:
if the operation signal input unit receives an operation signal of the user dragging the vehicle object in the image displayed on the display unit to a position of a specific operation candidate object of the plurality of operation candidate objects in the image, the command output unit outputs a command for instructing an operation represented by the specific operation candidate object, to the automatic driving controller.

4. The driving support device of claim 1 wherein:
an operation candidate object that represents the traffic lane change depicts a predicted route that the vehicle will take to change traffic lanes, and an operation candidate object that represents the passing of the another vehicle depicts a predicted route that the vehicle will take to pass the another vehicle.

5. The driving support device of claim 1, further comprising:
a determination unit which, in operation, determines the plurality of operations based on a position of the vehicle at the time of the user touching the vehicle object and a peripheral situation of the vehicle at the time of the user touching the vehicle object.

6. The driving support device of claim 1 wherein the command output unit outputs the automatic driving control command subsequent to the reception mode being changed from the reception enable mode to the reception disable mode.

7. The driving support device of claim 6 wherein the automatic driving controller determines, subsequent to the automatic driving control command being outputted, whether or not the automatic driving control command is executable, and the image output unit outputs, in response to the automatic driving control command being determined as executable, image information indicating that the automatic driving control command is being performed.

8. A driving support system which is included in a vehicle, the driving support system comprising:
a display device which, in operation, displays an image; and a driving support device which, in operation, outputs image information to the display device, wherein the driving support device includes:
an image output unit which, in operation, outputs image information including a vehicle object representing the vehicle and a peripheral situation of the vehicle, to the display device;

an operation signal input unit which, in operation, receives an operation signal of a user with respect to the vehicle object in an image displayed on the display device when a reception mode of the driving support device is set to a reception enable mode in which an operation from the user can be received; and a command output unit which, in operation, outputs an automatic driving control command corresponding to the received operation signal, to an automatic driving controller that controls automatic driving of the vehicle, if the operation signal input unit receives an operation signal of the user touching the vehicle object in the image displayed on the display device, the image output unit outputs image information including a plurality of operation candidate objects in a selectable state to the display unit, the plurality of operation candidate objects representing a plurality of operations that are automatically executable by the vehicle at a time of the user touching the vehicle object, the plurality of operation candidate objects being displayed in the image displayed on the display unit simultaneously, the plurality of operations including a traffic lane change, a passing of another vehicle, and a following of the another vehicle, the reception mode is changed from the reception enable mode to a reception disable mode in which an operation from the user cannot be received, in response to a predetermined time elapsing from when one of the plurality of operation candidate objects is selected, and the reception mode is changed from the reception disable mode to the reception enable mode in response to a notification indicating completion of an automatic driving control command corresponding to a selected operation candidate object of the plurality of operation candidate objects being received from the automatic driving controller, or it being determined that an automatic driving control command corresponding to a selected operation candidate object of the plurality of operation candidate objects is completed based on a behavior of the vehicle.

9. The driving support system of claim 8,
wherein the image output unit, in operation, outputs image information which highlights a traffic lane into which the vehicle is permitted to enter, to the display device.

10. The driving support system of claim 8, wherein:
if the operation signal input unit receives an operation signal of the user dragging the vehicle object in the image displayed on the display device to a position of a specific operation candidate object of the plurality of operation candidate objects in the image, the command output unit outputs a command for instructing an operation represented by the specific operation candidate object, to the automatic driving controller.

11. A driving support method comprising:
outputting image information including a vehicle object representing a vehicle and a peripheral situation of the vehicle, to a display unit;
receiving an operation signal of a user with respect to the vehicle object in an image displayed on the display unit when a reception mode is set to a reception enable mode in which an operation from the user can be received; and
outputting an automatic driving control command corresponding to the received operation signal, to an automatic driving controller that controls automatic driving of the vehicle,
wherein if an operation of the user touching the vehicle object in the image displayed on the display unit is received in the receiving of the operation signal, in the outputting of the image information, image information including a plurality of operation candidate objects in a selectable state is output to the display unit, the plurality of operation candidate objects representing a plurality of operations that are automatically executable by the vehicle at a time of the user touching the vehicle object is touched, the plurality of operation candidate objects being displayed in the image displayed on the display unit simultaneously, the plurality of operations including a traffic lane change, a passing of another vehicle, and a following of the another vehicle, and
the reception mode is changed from the reception enable mode to a reception disable mode in which an operation from the user cannot be received, in response to a predetermined time elapsing from when one of the plurality of operation candidate objects is selected, and
the reception mode is changed from the reception disable mode to the reception enable mode in response to
a notification indicating completion of an automatic driving control command corresponding to a selected operation candidate object of the plurality of operation candidate objects being received from the automatic driving controller, or
it being determined that an automatic driving control command corresponding to a selected operation candidate object of the plurality of operation candidate objects is completed based on a behavior of the vehicle.

12. The driving support method of claim 11,
wherein image information which highlights a traffic lane into which the vehicle is permitted to enter is output to the display unit in the outputting of the image information.

13. The driving support method of claim 11, wherein:
if an operation signal of the user dragging the vehicle object in the image displayed on the display unit to a position of a specific operation candidate object of the plurality of operation candidate objects in the image is received in the receiving of the operation signal, a command for instructing an operation represented by the specific operation candidate object is output to the automatic driving controller in the outputting of the automatic driving control command.

\* \* \* \* \*